United States Patent
Pandey et al.

(10) Patent No.: US 7,752,626 B1
(45) Date of Patent: Jul. 6, 2010

(54) SYSTEM AND METHOD FOR RMI-IIOP REQUEST LOAD BALANCING

(75) Inventors: Dhirendra Pandey, Fremont, CA (US); Darpan Dinker, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1134 days.

(21) Appl. No.: 10/675,479

(22) Filed: Sep. 30, 2003

(51) Int. Cl.
G06F 9/46 (2006.01)
G06F 15/16 (2006.01)
G06F 9/00 (2006.01)
G06F 9/44 (2006.01)
G06F 13/00 (2006.01)

(52) U.S. Cl. .................. 718/105; 709/203; 719/316

(58) Field of Classification Search ................ 718/105; 709/203, 105
See application file for complete search history.

(56) References Cited

U.S. PATENT DOCUMENTS 6,393,458 B1 * 5/2002 Gigliotti et al. ............. 709/203
2003/0014469 A1 * 1/2003 Ramaswamy ............... 709/105

OTHER PUBLICATIONS

"Java 2 Platform SE v1.3.1: Interface InitialContextFactory", http://java.sun.com/j2se/1.3/docs/api/javax/naming/spi/InitialContextFactory.html.*
*Java to IDL Language Mapping Specification*, version 1.3, Sep. 22, 2003 www.omg.org/docs/formal/03-09-04.pdf.
*Java Naming and Directory Interface Application Programming Interface (JNDI API)*; Sun Microsystems; Jul. 14, 1999; http://java.sun.com/j2se/1.5/pdf/jndi.pdf.

* cited by examiner

*Primary Examiner*—Meng-Ai An
*Assistant Examiner*—Eric C Wai
(74) *Attorney, Agent, or Firm*—Robert C Kowert; Meyertons, Hood, Kivlin, Kowert & Goetzel, P.C.

(57) ABSTRACT

System and method for client-side RMI-IIOP request load balancing. Embodiments provide a vendor-independent mechanism for load balancing RMI-IIOP requests using standards-based JNDI (Java Naming and Directory Interface) SPIs. One embodiment may use an implementation of a Context Factory class such as the JNDI ContextFactory SPI (Service Provider Interface) for RMI-IIOP request load balancing. Using embodiments, a client may load-balance RMI-IIOP requests to application server instances in an application server cluster. A plurality of client-side Object Request Brokers (ORBs) may be created "up front" on a client system. After the client-side ORBs are initially created, the client-side ORBs may be selected according to a load balancing scheme in response to requests to access the application server. Note that embodiments may be adapted for use in client-side load balancing for other types of client-server systems.

20 Claims, 4 Drawing Sheets

SYSTEM AND METHOD FOR RMI-IIOP REQUEST LOAD BALANCING

BACKGROUND OF THE INVENTION

1. Field of the Invention

This invention relates to computer software, and more particularly to client-side load balancing of requests to a plurality of application server instances.

2. Description of the Related Art

RMI (Remote Method Invocation) is a way that a programmer, using the Java programming language and development environment, can write object-oriented programming in which objects on different computers can interact in a distributed network. RMI is the Java version of what is generally known as a remote procedure call (RPC), but with the ability to pass one or more objects along with the request. The object can include information that will change the service that is performed in the remote computer. The object parameter-passing mechanism may be referred to as object serialization. An RMI request is a request to invoke the method of a remote object. The request has the same syntax as a request to invoke an object method in the same (local) computer. In general, RMI is designed to preserve the object model and its advantages across a network.

RMI is implemented as three layers:

A stub (proxy) program in the client side of the client/server relationship, and a corresponding skeleton at the server end. The stub appears to the calling program to be the program being called for a service.

A Remote Reference Layer that can behave differently depending on the parameters passed by the calling program. For example, this layer can determine whether the request is to call a single remote service or multiple remote programs as in a multicast.

A Transport Connection Layer, which sets up and manages the request.

A single request travels down through the layers on one computer and up through the layers at the other end.

IIOP (Internet Inter-ORB Protocol) is a protocol that makes it possible for distributed programs written in different programming languages to communicate over the Internet. IIOP is a critical part of an industry standard, the Common Object Request Broker Architecture (CORBA). CORBA is an architecture and specification for creating, distributing, and managing distributed program objects in a network. CORBA allows programs at different locations and developed by different vendors to communicate in a network through an "interface broker."

An essential concept in CORBA is the Object Request Broker (ORB). An Object Request Broker (ORB) is the programming that acts as a "broker" between a client request for a service from a distributed object or component and the completion of that request. ORB support in a network of clients and servers on different computers means that a client program (which may itself be an object) can request services from a server program or object without having to understand where the server is in a distributed network or what the interface to the server program looks like. Components can find out about each other and exchange interface information as they are running. To make requests or return replies between the ORBs, programs use the General Inter-ORB Protocol (GIOP) and, for the Internet, Internet Inter-ORB Protocol (IIOP). IIOP maps GIOP requests and replies to the Internet's Transmission Control Protocol (TCP) layer in each computer.

The Java Naming and Directory Interface™ (JNDI) provides naming and directory functionality to applications written in the Java programming language. JNDI is designed to be independent of any specific naming or directory service implementation. Thus a variety of services—new, emerging, and already deployed ones—can be accessed in a common way. The JNDI architecture consists of an API (Application Programming Interface) and an SPI (Service Provider Interface). Java applications use the JNDI API to access a variety of naming and directory services. The JNDI SPI enables a variety of naming and directory services to be plugged in transparently, allowing the Java application using the JNDI API to access their services.

JNDI is a standard extension to the Java platform, providing Java technology-enabled applications with a unified interface to multiple naming and directory services. Part of the Java Enterprise application programming interface (API) set, JNDI makes it possible for developers to create portable applications that are enabled for a number of different naming and directory services, including: file systems; directory services such as Lightweight Directory Access Protocol (LDAP), Novell Directory Services, and Network Information System (NIS); and distributed object systems such as the Common Object Request Broker Architecture (CORBA), Java Remote Method Invocation (RMI), and Enterprise JavaBeans (EJB).

The Common Object Services (COS) Name Server is the name server for storing Common Object Request Broker Architecture (CORBA) object references. It can be accessed from CORBA applications by using the COS Naming package (org.omg.CORBA.CosNaming). The JNDI/COS naming service provider implements the javax.naming.Context interface on top of the COS Naming package in order to allow applications to use JNDI to access the COS Name Server. JNDI can also be used to access other naming and directory services, in addition to the COS Name Server, thereby offering the CORBA application one interface for accessing different naming and directory services.

Many users of J2EE-compliant application servers frequently find themselves in need of a load balancing solution for RMI-IIOP requests made to the application server. These requirements typically stem from declining application throughput and performance when using a single instance of the application server process under load from RMI-IIOP client(s). Users typically write and test RMI-IIOP client applications working against a single application server instance (process). However, when this application is placed in a production scenario with a few hundred or thousand users sending requests to a single instance of the application server, performance problems and bad response times for the end users of the application may occur. These performance problems are typically due to the inability of a single JVM to scale to so many requests, inadequate sizing of the hardware that houses the application, etc.

A solution to the performance problems caused by using a single instance of an application may include deploying and running the application on multiple instances (processes) of the application server running on separate machines or on a single large machine with multiple CPUs (which may be referred to as application server clusters). Using this architecture, it is desirable to provide load balancing of client requests to the application server instances. While load balancing solutions and products (both hardware and software based) exist for HTTP requests, there are few solutions for load balancing RMI-IIOP requests. These solutions typically have proprietary architectures and require vendor dependence for the end user. Therefore, it is desirable to provide a vendor-independent client-side load balancing mechanism for RMI-IIOP requests.

SUMMARY

Embodiments of a system and method for client-side RMI-IIOP request load balancing are described. Embodiments provide a vendor-independent mechanism for load balancing RMI-IIOP requests using standards-based JNDI (Java Naming and Directory Interface) SPIs. One embodiment may use an implementation of a Context Factory class such as the JNDI ContextFactory SPI (Service Provider Interface) for RMI-IIOP request load balancing. Using embodiments, a client may load-balance RMI-IIOP requests to one or more of the application server instances in an application server cluster. Embodiments may load-balance RMI-IIOP requests of one or more clients to different application server processes, thereby preferably improving response time and overall system performance.

A plurality of client-side Object Request Brokers (ORBs) may be created "up front" on a client system. In one embodiment, each client-side ORB is coupled to a server-side ORB of a different one of a plurality of instances of an application server. After the client-side ORBs are initially created, one of the plurality of client-side ORBs may be selected according to a load balancing scheme in response to a request to access the application server. Any of a variety of load balancing schemes may be used, including, but not limited to, random, round robin, or intelligent schemes. In one embodiment, creating a plurality of client-side ORBs and selecting one of the plurality of client-side ORBs are performed by a Context Factory class (e.g. a JNDI Context Factory class), further described below.

In one embodiment, a client application on the client system may generate the request to access the application server. The client application may access one of the plurality of application server instances via the selected client-side ORB as indicated at 304. In one embodiment, accessing the application server instance via the selected client-side ORB is performed according to RMI-IIOP. At some point, a different one of the client-side ORBs may be selected according to the load balancing scheme in response to another request to access the application server. The client application may then access a different one of the application server instances using the different client-side ORB.

One embodiment utilizes JNDI SPI (Service Provider Interface)—in particular the InitialContextFactory SPI—to implement client-side RMI-IIOP request load balancing. This embodiment provides an implementation of InitialContextFactory interface that pre-creates client ORBs with connections opened to the application server instances. In one embodiment, the mechanism or scheme used to load-balance server usage is implemented in the ContextFactory class. Every time an InitialContext is created, a different client ORB instance is used by the implemented ContextFactory, thereby load balancing the RMI-IIOP requests to different application server instances. The mechanism for load balancing used by the ContextFactory class may be a random scheme, a round-robin scheme, based on an intelligent feedback mechanism, or some other load balancing scheme. In one embodiment, the particular scheme used may depend on the particular implementation. Different schemes may be suitable for different environments.

Note that embodiments may be adapted for use in other types of systems. Also note that while embodiments are generally described for use in systems that use RMI/IIOP and ORBs for communicate between client systems and EJBs on the application servers, other embodiments may be used in environments that use other non-RMI-IIOP mechanisms to communicate with the application server instances to provide load balancing.

Figure 1:
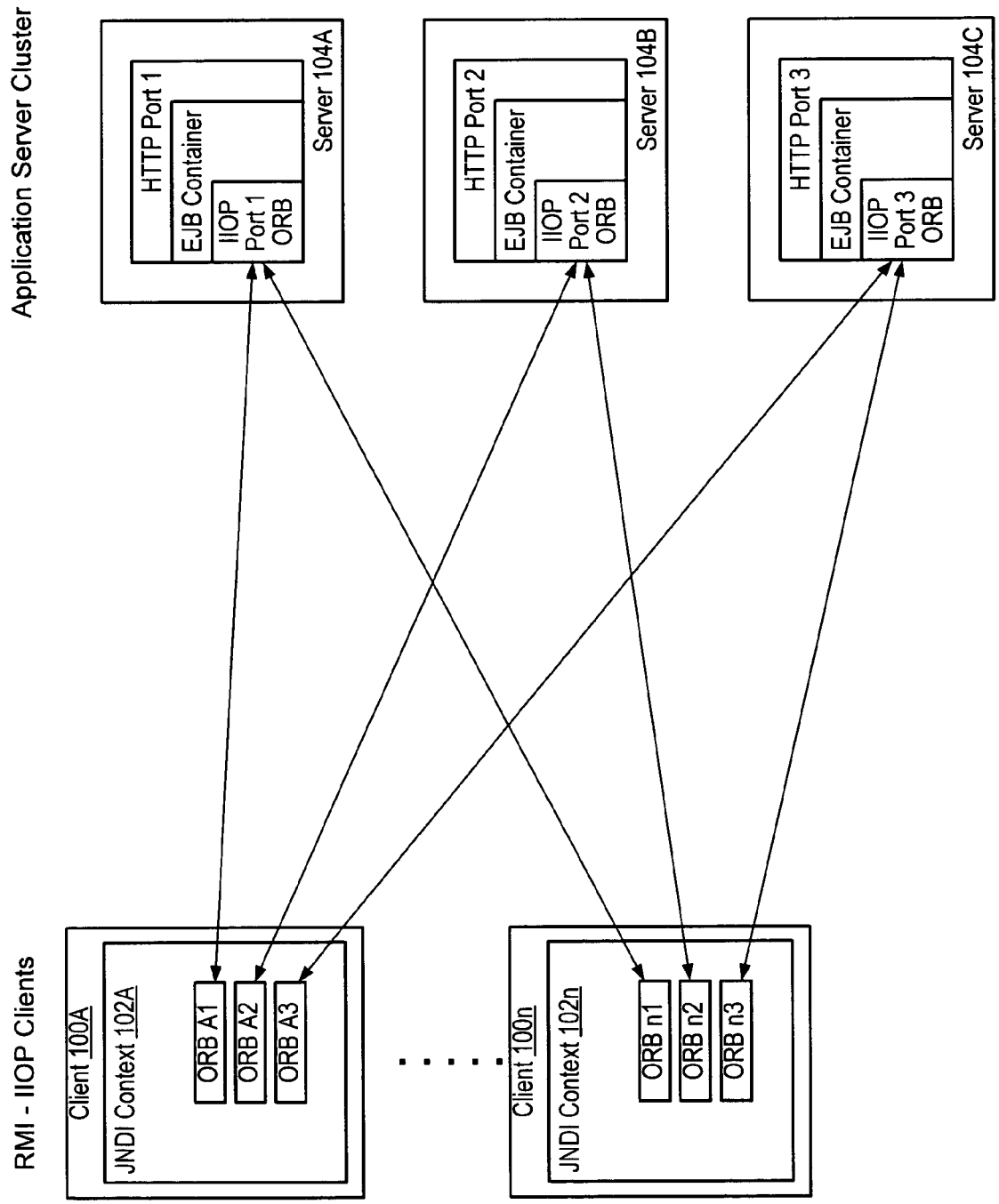
FIG. 1 illustrates a client/server system using client-side load balancing to load balance RMI/IIOP requests to application server instances according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for client-side RMI-IIOP request load balancing are described. Some embodiments may provide a vendor-independent mechanism for load balancing RMI-IIOP requests using standards-based JNDI (Java Naming and Directory Interface) SPIs. One embodiment may use an implementation of a Context Factory class such as the JNDI ContextFactory SPI (Service Provider Interface) for RMI-IIOP request load balancing. Using embodiments, a client may load-balance RMI-IIOP requests to one or more of the application server instances in an application server cluster. Embodiments may load-balance RMI-IIOP requests of one or more clients to different application server processes, thereby preferably improving response time and overall system performance.

One embodiment provides a mechanism to load-balance RMI/IIOP requests from one or more rich clients to a plurality of application server instances. In single-server instances, the server can get overwhelmed if there are too many rich client requests for the application server to handle. An architecture with a single application server instance may not scale well to a lot of rich clients. In such cases, an architecture with multiple application server instances (e.g., an application server cluster) may be desired. For multiple application server instance architectures, embodiments provide a mechanism on the rich client(s) that provides client-side load balancing to the application server instances.

Embodiments are generally described herein for used in systems that use J2EE to access enterprise Beans (EJBs) hosted on the host server instances. The mechanism to look up the beans is through JNDI. Note that embodiments may be adapted for use in other types of systems. Also note that while embodiments are generally described for use in systems that use RMI/IIOP and ORBS for communicate between client systems and EJBs on the application servers, other embodiments may be used in environments that use other non-RMI-IIOP mechanisms to communicate with the application server instances to provide load balancing.

FIG. 1 illustrates a client/server system using client-side load balancing to load balance RMI/IIOP requests to application server instances according to one embodiment. In this example, there are three application server instances (servers 104A, 104B and 104C), which may each be running on a different host machine in an application server cluster, and n clients 100A-100n. Note that two or more application server instances may be hosted by the same host machine.

In one embodiment, each client 102 may, at startup or at some other time, create a different client-side ORB for each server "up front", for example at startup. Thus, in this example, client 102A has created ORBs A1-A3, with one ORB for each server 104 in the cluster. Note that each client ORB connects to one of the server-side IIOP port ORBs on the server side. In one embodiment, a factory class (described later in this document) may be used to pre-create create the ORBs and to select an ORB from the pre-created ORBs when needed to provide load balancing. In one embodiment, the ORBs may be created in a JNDI context 102. In one embodiment, when a client 102 desires to communicate with a server 104, e.g. to access an EJB on the server, the JNDI context may use a load balancing scheme to select one of the pre-created ORBs to one of the servers 104 to be used. In one embodiment, each time an ORB is requested, a different one of the pre-created ORBs may be provided (up to the point where the set of ORBs has been used and may be re-used again). The load balancing scheme used may be a random scheme, a round-robin scheme, an intelligent scheme, or any other suitable scheme.

Figure 2:
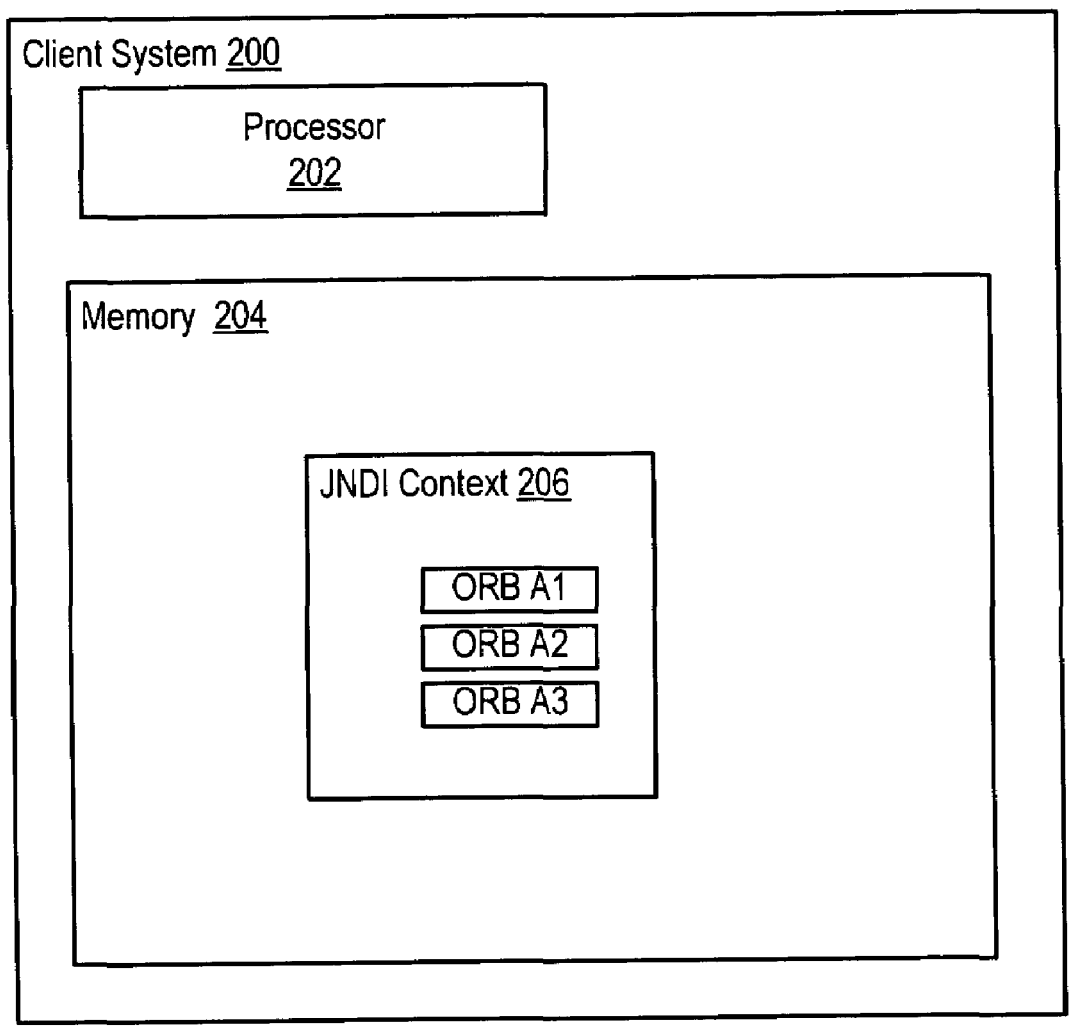
FIG. 2 illustrates a client system implementing a JNDI context configured to provide load balancing of RMI-IIOP requests according to one embodiment.

FIG. 2 illustrates a client system implementing a JNDI context configured to provide load balancing of RMI-IIOP requests according to one embodiment. Client system 200 may be any of various types of devices, including, but not limited to, a personal computer system, desktop computer, laptop or notebook computer, mainframe computer system, workstation, network computer, or other suitable device. Client system 200 may include at least one processor 202. The processor 202 may be coupled to a memory 204. Memory 204 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Client system 200 may couple over a network to one or more other devices via one or more wired or wireless network interfaces, such as one or more host machines each hosting one or more application server instances.

Client system 200 may include, in memory 204, an implementation of a JNDI context 206 that may be configured to provide client-side RMI-IIOP request load balancing to a plurality of application server instances. In one embodiment, the JNDI context may provide an interface to applications on the client system 200 that the applications may use to generate a plurality of client-side ORBs "up front", each connecting to a different one of the application server instances. After the initial creation of the client-side ORBs, an application on the client system 200 may use the interface to obtain one of the pre-generated client-side ORBs, selected by the JNDI context using a load balancing scheme (e.g. random, round robin, intelligent, or other scheme, depending on the application).

In general, a client knows what the endpoints are it desires or needs to talk to. In one embodiment, prior to connecting to the endpoints (e.g. "up front" at startup or before accessing the application server instances), a client may create the client ORBs for all the endpoints that may be used to talk to the backends (server instances). From then on, the pre-created client ORBs may be invoked using a load balancing scheme to select the client ORBs to access the server instances. In one embodiment, the client ORBs are created as they would normally be created (e.g. using JNDI), but instead of creating a client ORB instance when needed, one or more client-side ORB instances are generated "up front", in one embodiment with one client-side ORB for each application server instance (e.g. using InitialContextFactory( ) and, when the client desires to communicate with an application server instance, a load balancing scheme is used to randomly or intelligently select one of the client-side ORBs. In one embodiment, a mechanism (e.g. a Context Factory method) may be provided that performs the load balancing according to some load balancing scheme for selecting a client ORB when a client requests a connection to an application server instance.

Embodiments may associate each pre-created client ORB with a different application server instance. To do this, in one embodiment, there may be a host/port combination that is passed to the client through a system define. In another embodiment, a DNS on the client machine may be used to set up multiple IP addresses for a host name. The same port may be used for all the IP addresses associated with the host name. In Java, when GetHostByNames( ) is called, it returns all the IP addresses associated with a host name. These IP addresses may be used with a static port known or defined at runtime to create the ORBs specific to the server backends.

Figure 3:
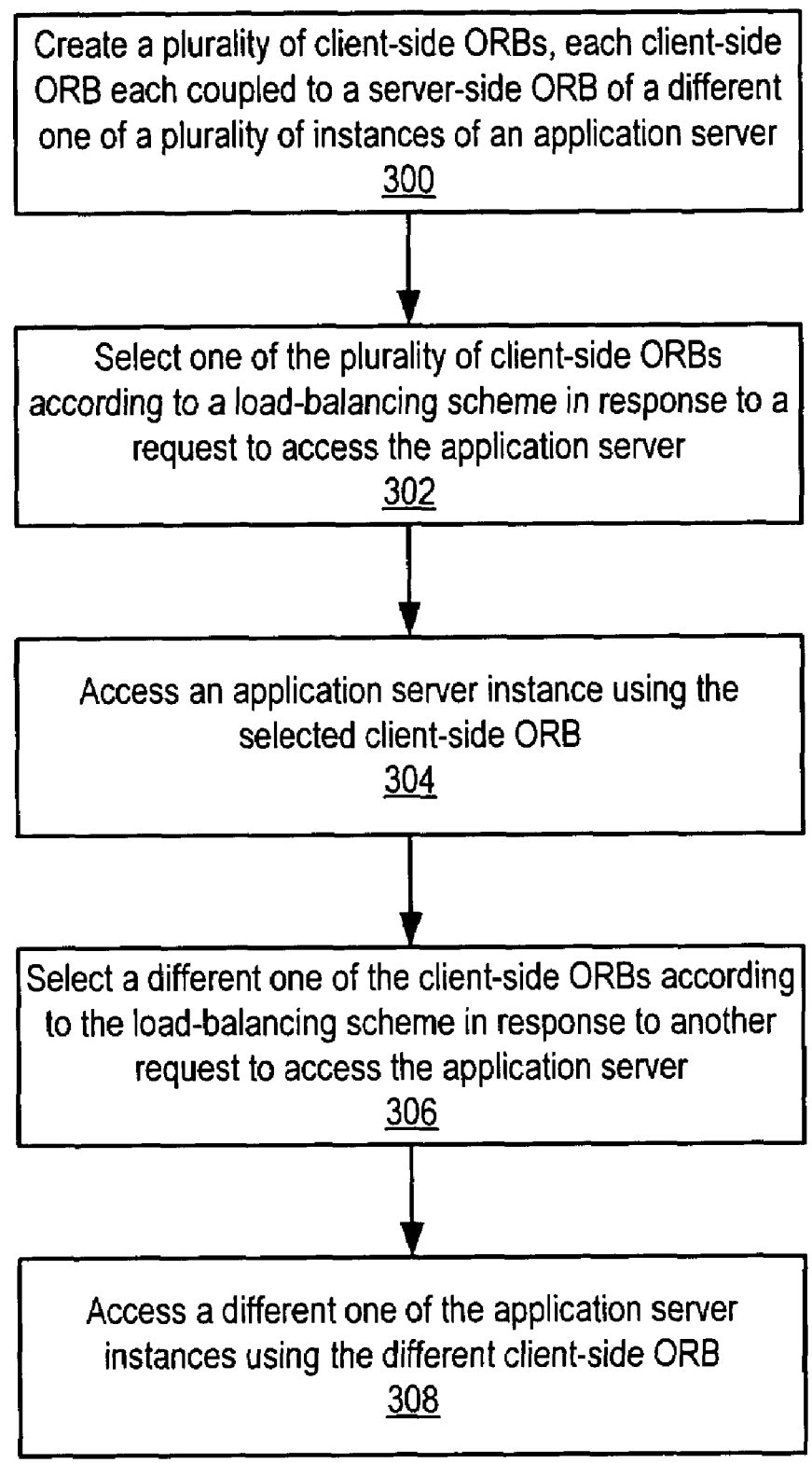
FIG. 3 is a flowchart of a method for client-side load balancing of RMI-IIOP (or other) requests to application server instances according to one embodiment.

FIG. 3 is a flowchart of a method for client-side load balancing of RMI-IIOP (or other) requests to application server instances according to one embodiment. As indicated at 300, a plurality of client-side Object Request Brokers (ORBs) may be created "up front" on a client system. In one embodiment, each client-side ORB is coupled to a server-side ORB of a different one of a plurality of instances of an application server. As indicated at 302, after the client-side ORBs are initially created, one of the plurality of client-side ORBs may be selected according to a load balancing scheme in response to a request to access the application server. Any of a variety of load balancing schemes may be used, including, but not limited to, random, round robin, or intelligent schemes. In one embodiment, creating a plurality of client-side ORBs and selecting one of the plurality of client-side ORBs are performed by a Context Factory class (e.g. a JNDI Context Factory class), further described below.

In one embodiment, a client application on the client system may generate the request to access the application server. The client application may access one of the plurality of application server instances via the selected client-side ORB as indicated at 304. In one embodiment, accessing the application server instance via the selected client-side ORB is performed according to RMI-HOP.

As indicated at 306, a different one of the client-side ORBs may be selected according to the load balancing scheme in response to another request to access the application server.

As indicated at 308, the client application may then access a different one of the application server instances using the different client-side ORB.

The following describes means for creating a plurality of client-side ORBs, with each client-side ORB coupled to a server-side ORB of a different one of a plurality of instances of an application server, and means for selecting from the plurality of client-side ORBs to provide load balancing of the application server instances in response to requests for access to the application server.

One embodiment utilizes JNDI (Java Naming and Directory Interface) SPI (Service Provider Interface)—in particular the InitialContextFactory SPI—to implement client-side RMI-IIOP request load balancing. This embodiment provides an implementation of InitialContextFactory interface that pre-creates client ORBs with connections opened to the application server instances. In one embodiment, the mechanism or scheme used to load-balance server usage is implemented in the ContextFactory class. Every time an InitialContext is created, a different client ORB instance is used by the implemented ContextFactory, thereby load balancing the RMI-IIOP requests to different application server instances. The mechanism for load balancing used by the ContextFactory class may be a random scheme, a round-robin scheme, based on an intelligent feedback mechanism, or some other load balancing scheme. In one embodiment, the particular scheme used may depend on the particular implementation. Different schemes may be suitable for different environments.

RMI-IIOP application client code typically includes a section of code that looks somewhat like the following example:
1. Context ctx=new InitialContext( );
2. Object obj=ctx.lookup("java:comp/env/ejb/MyApp");
3. MyAppRemoteHome home=(MyAppRemoteHome) PortableRemoteObject.narrow(obj, MyAppRemoteHome.class);
4. MyAppRemote remote=home.create( );
5. remote.executeRemoteMethod( );

Typically, an RMI-IIOP connection is created in line 1 by the client ORB, to the remote host and port on which the application server process is listening for RMI-IIOP connection requests. Subsequent RMI-IIOP requests from the client in lines 2, 4 and 5 use this connection to send and receive requests and responses from the application server process. This snipped of code illustrates a typical way for accessing an application server from a rich client. Typically, when new InitialContext( ) is called, a client ORB is created that uses initialization code to make a connection to a remote ORB that is running on an instance of the application server. The client ORB is then used to do the lookup, creation, and execution of remote method(s) on the application server instance.

In one embodiment, when there are n application server instances (processes), each time the above code snippet is executed, an application server instance is selected from n application server instances (processes) using a load balancing scheme and then used to execute the remote request. In this embodiment, new InitialContext( ) in line 1, when executed, uses a load balancing scheme to select a different host and port destination that denotes an application server instance (process), so that the subsequent RMI-HOP requests are directed to the selected application server instance. Using this mechanism, these requests may be load-balanced to any of the application server instances. The load balancing scheme used to select the destination host and port (i.e. the application server instance) may be based on a random, round robin, or any other load balancing scheme.

In one embodiment, JNDI is used in new InitialContext( ) in the client code. The instance of InitialContext that is created uses the ContextFactory. Embodiments provide a modified or new ContextFactory class that performs the load balancing.

new InitialContext( ) calls InitialContextFactory( ) new InitialContext( ) is a Factory SPI that in turn calls InitialContextFactory( ) (part of JNDI). In JNDI, there is a method called GetInitialContext( ) that is called by InitialContextFactory( ) every time new InitialContext( ) is called. In one embodiment, an implementation of JNDI's InitialContextFactory SPI may be used to provide the RMI-IIOP request load balancing. The following illustrates the InitialContextFactory interface, which defines one method (getInitialContext( )):

public interface InitialContextFactory {public Context getInitialContext(Hashtable environment) throws NamingException}

In one embodiment, when getInitialContext( ) is called, the class is initialized to create more than one ORB at startup on the client side if there are more than one application server instances. After initialization, every time new InitialContext( ) is called, a different instance of the client ORB may be provided to the caller. Each of these client ORBs are connected to a different server-side ORB on the application server instances. In one embodiment, for example, if there are four application server instances, four client ORBs are created; each of the four client ORBs are connected to one of the application server ORBs. Every time a new InitialContext( ) is performed, the call may be load-balanced to any one of the application server instances.

The method getInitialContext( ) is called every time "new InitialContext( )" is executed in a client program to create and return the Context object. In one embodiment, a factory class may implement this interface, such that at class load time (statically) all the client ORBs are created by passing them the remote host and port address of the application server instances using CORBA properties (such as org.omg.CORBA.InitialHost and/or org.omg.CORBA.InitialPort). These instantiated ORBs are already created and have opened an IIOP connection over TCP/IP to each of the n application server instances (processes). Essentially, there is a client ORB for each application server instance (process) stored in some static table in this class. To provide client-side load balancing, java.naming.corba.orb may be set to an instance of the client ORB (from the static table of the implemented factory class) and added in the Hashtable passed for creating the Context. This is based on the COS Naming Service Provider for JNDI.

Every time the client program calls "new InitialContext( )", a different client ORB and hence a different application server instance may be used to send/receive the requests from that client, preferably achieving RMI-IIOP load balancing. Which client ORB instance is selected may depend on load balancing schemes and/or policies for the particular implementation (Random, Round-Robin, intelligent.) of the Context Factory class. In one embodiment, the client program sets the java.naming.factory.initial system property to the Context Factory class that implements the load balancing scheme in order for the Context Factory class to be used when "new InitialContext( )" is called.

The following is an exemplary implementation of a Context Factory class that may be used to provide client-side RMI-IIOP request load balancing and is not intended to be limiting.

```
package com.somecompany.naming;
import javax.naming.spi.InitialContextFactory;
import javax.naming.*;
import java.util.Hashtable;
public class MyContextFactory implements InitialContextFactory {
    private static final int MAX_INSTANCES = 4;
    private static ORB[ ] clientORBs = new ORB[MAX_INSTANCES];
    private static int index = 0;
    static {
        // Create ORBs with different host:port combinations based
        // on number of application server instances.
        for (int i=0; i<MAX_INSTANCES; i++) {
            clientORBs[i]=ORB.init(...);
        }
    }
    private int getIndex( ) {
        index = (index++) % MAX_INSTANCES;
        return index;
    }
    public Context getInitialContext(Hashtable env) throws
    NamingException {
        env. put("java.naming.corba.orb", clientORBs[getIndex( )]);
        return new MyContext(env);
    }
}
```

In this example, the client program would set java.naming.factory.initial system property to com.somecompany.naming.MyContextFactory. In this example, four instances of the client-side ORB are created. Note that, in other embodiments, other numbers of client-side ORBs to be created may be statically defined, dynamically determined, or passed to the Context Factory class. Each created instance of a client-side ORB connects to a different host and port combination on the server. When GetInitialContext( ) is performed, it uses "env.put(java.naming.corba.orb", clientORBs [getIndex( )]);" to get one of the pre-created client ORBS and to put that instance of the client ORB in an environment, and passes that environment back. getIndex( ) is used to select one of the ORBs. In this example, GetIndex( ) increments index (index++) and uses a modulo operation on the result with MaximumInstances of client ORBs, so that the next ORB in line is accessed the next time getIndex( ) is called. In other words, this example uses a round-robin scheme that is "random" in a sense, but note that it is up to the implementer to make the scheme as intelligent and precise as desired, or as simple as the round robin scheme used in this example.

Figure 4:
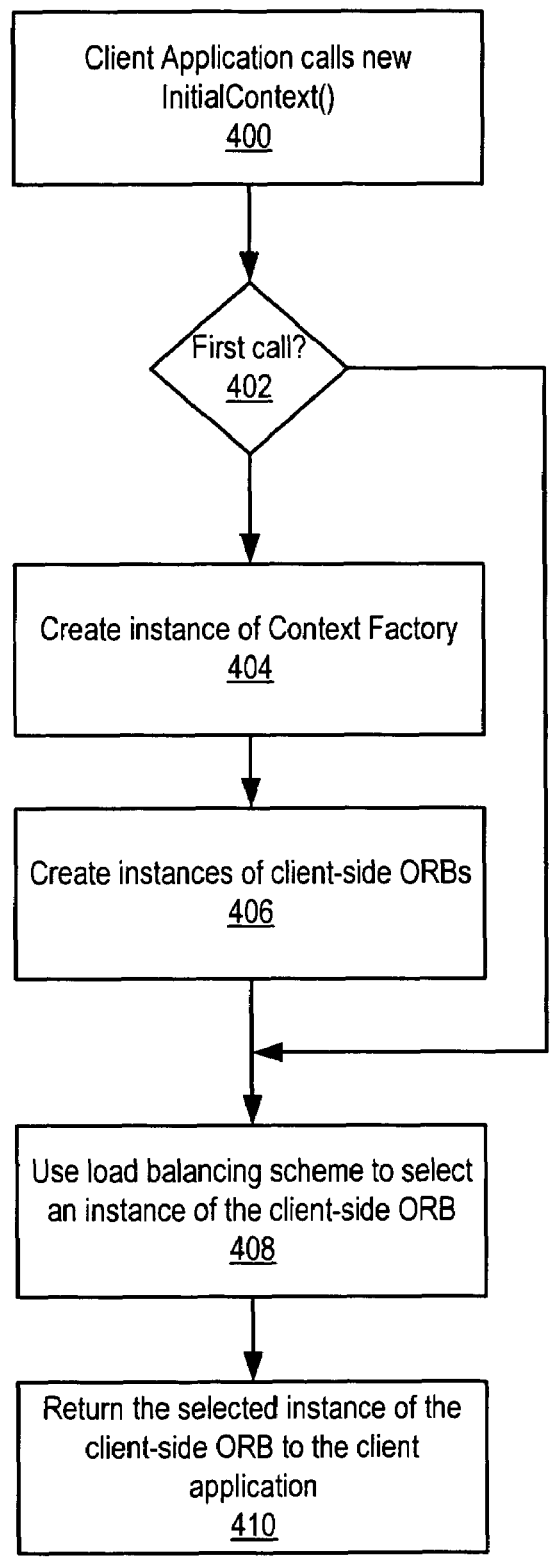
FIG. 4 is a flowchart of a method of using a JNDI Context Factory class to provide client-side load balancing of RMI-IIOP requests according to one embodiment.

FIG. 4 is a flowchart of a method of using a JNDI Context Factory class to provide client-side load balancing of RMI-IIOP requests according to one embodiment. As indicated at 400, a client Application calls new InitialContext( ). At 402, if this is the first call to new InitialContext( ) then an instance of the ContextFactory class is created as indicated at 404. During instantiation, the instances of the client-side ORBs are created as indicated at 406, in one embodiment with one instance of a client-side ORB for each application server instance. As indicated at 408, a load balancing scheme may then be used to select one of the client-side ORBs. The selected client-side ORB may then be returned to the client application as indicated at 410. The client application may then use the client-side ORB to communicate with the application server instance.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    one or more host machines configured to implement a plurality of instances of an application server; and
    one or more client machines each configured to implement one or more clients of the application server, wherein each client on a respective one of the one or more client machines is configured to:
        create a different client-side Object Request Broker (ORB) on the client machine for each of the plurality of application server instances to generate a plurality of client-side ORBs each corresponding to a different one of the application server instances, wherein each client-side ORB is coupled to a server-side ORB of its corresponding application server instance;
        select one of the plurality of client-side ORBs created by the client on the client machine according to a load balancing scheme in response to a request to access the application server; wherein the load balancing scheme comprises a random scheme, a round robin scheme, or an intelligent scheme based on feedback; wherein the load balancing scheme distributes requests to access the application server from the client among the plurality of client-side ORBs created by the client, thereby distributing the requests to access the application server from the client among the plurality of application server instances; and
        access the application server instance corresponding to the selected client-side ORB via the selected client-side ORB coupled to the server-side ORB of the corresponding application server instance.

2. The system as recited in claim 1, wherein said access of a particular one of the plurality of application server instances via the selected client-side ORB is performed according to RMI-IIOP (Remote Method Invocation—Internet Inter-ORB Protocol).

3. The system as recited in claim 1, wherein said creation of a plurality of client-side ORBs and said selection of one of the plurality of client-side ORBs according to a load balancing scheme are performed by a Context Factory class.

4. The system as recited in claim 3, wherein the Context Factory class is a factory class of a naming and directory interface that provides naming and directory functionality to applications.

5. The system as recited in claim 1, wherein each client on a respective one of the one or more client machines is further configured to:

select a different one of the plurality of client-side ORBs on the client machine according to the load balancing scheme in response to another request to access the application server; and access a different one of the plurality of application server instances using the different client-side ORB coupled to a server-side ORB of the different application server instance.

6. A client machine, comprising:

a processor; and a memory comprising program instructions, wherein the program instructions are executable by the processor to implement:

create a plurality of client-side Object Request Brokers (ORBs) on the client machine for a client of an application server, wherein a different client-side ORB is created on the client machine for each of a plurality of instances of the application server to generate a plurality of client-side ORBs each corresponding to a different one of the application server instances, wherein the client is on the client machine, wherein each client-side ORB is coupled to a server-side ORB of its corresponding instance of the application server on one or more host machines;

select one of the plurality of client-side ORBs on the client machine according to a load balancing scheme in response to a request to access the application server; wherein the load balancing scheme comprises a random scheme, a round robin scheme, or an intelligent scheme based on feedback; wherein the load balancing scheme distributes requests to access the application server from the client among the plurality of client-side ORBs, thereby distributing the requests to access the application server from the client among the plurality of application server instances; and access the application server instance corresponding to the selected client-side ORB via the selected client-side ORB coupled to the server-side ORB of the corresponding application server instance.

7. The client machine as recited in claim 6, wherein said access of a particular one of the plurality of application server instances via the selected client-side ORB is performed according to RMI-IIOP (Remote Method Invocation—Internet Inter-ORB Protocol).

8. The client machine as recited in claim 6, wherein said creation of a plurality of client-side ORBs and said selection of one of the plurality of client-side ORBs according to a load balancing scheme are performed by a Context Factory class.

9. The client machine as recited in claim 8, wherein the Context Factory class is a factory class of a naming and directory interface that provides naming and directory functionality to applications.

10. The client machine as recited in claim 6, wherein the program instructions are further executable by the processor to:

select a different one of the plurality of client-side ORBs on the client machine according to the load balancing scheme in response to another request to access the application server; and access a different one of the plurality of application server instances using the different client-side ORB coupled to a server-side ORB of the different application server instance.

11. A computer-implemented method, comprising:

creating a plurality of client-side Object Request Brokers (ORBs) on a client machine for a client application on the client machine, wherein a different client-side ORB is created on the client machine for each of a plurality of instances of an application server to generate a plurality of client-side ORBs each corresponding to a different one of the application server instances, wherein each client-side ORB is coupled to a server-side ORB of its corresponding application server instance;

the client application requesting access to the application server;

selecting one of the plurality of client-side ORBs on the client machine according to a load balancing scheme in response to the request; wherein the load balancing scheme comprises a random scheme, a round robin scheme, or an intelligent scheme based on feedback; wherein the load balancing scheme distributes requests to access the application server from the client application among the plurality of client-side ORBs, thereby distributing the requests to access the application server from the client application among the plurality of application server instances; and the client application accessing the application server instance corresponding to the selected client-side ORB via the selected client-side ORB coupled to the server-side ORB of the corresponding application server instance.

12. The computer-implemented method as recited in claim 11, wherein said accessing a particular one of the plurality of application server instances via the selected client-side ORB is performed according to RMI-IIOP (Remote Method Invocation—Internet Inter-ORB Protocol).

13. The computer-implemented method as recited in claim 11, wherein said creating a plurality of client-side ORBs and said selecting one of the plurality of client-side ORBs according to a load balancing scheme in response to the request are performed by a Context Factory class.

14. The computer-implemented method as recited in claim 13, wherein the Context Factory class is a factory class of a naming and directory interface that provides naming and directory functionality to applications written in Java programming language.

15. The computer-implemented method as recited in claim 11, further comprising:

the client application requesting another access to the application server;

selecting a different one of the plurality of client-side ORBs on the client machine according to the load balancing scheme in response to the other request; and the client application accessing a different one of the plurality of application server instances using the different client-side ORB coupled to a server-side ORB of the different application server instance.

16. A computer-accessible storage medium comprising program instructions, wherein the program instructions are computer-executable to implement:

creating a plurality of client-side Object Request Brokers (ORBs) on a client machine for a client application the client machine, wherein a different client-side ORB is created on the client machine for each of a plurality of instances of the application server to generate a plurality of client-side ORBs each corresponding to a different one of the application server instances, wherein each client-side ORB is coupled to a server-side ORB of its corresponding application server instance;

receiving a request from the client application for access to the application server;

selecting one of the plurality of client-side ORBs on the client machine according to a load balancing scheme in response to the request; wherein the load balancing scheme comprises a random scheme, a round robin scheme, or an intelligent scheme based on feedback; wherein the load balancing scheme distributes requests to access the application server from the client application among the plurality of client-side ORBs, thereby distributing the requests to access the application server from the client application among the plurality of application server instances; and the client application accessing the application server instance corresponding to the selected client-side ORB via the selected client-side ORB coupled to the server-side ORB of the corresponding application server instance.

17. The computer-accessible storage medium as recited in claim 16, wherein said accessing a particular one of the plurality of application server instances via the selected client-side ORB is performed according to RMI-IIOP (Remote Method Invocation—Internet Inter-ORB Protocol).

18. The computer-accessible storage medium as recited in claim 16, wherein said creating a plurality of client-side ORBs and said selecting one of the plurality of client-side ORBs according to a load balancing scheme in response to the request are performed by a Context Factory class.

19. The computer-accessible storage medium as recited in claim 18, wherein the Context Factory class is a factory class of a naming and directory interface that provides naming and directory functionality to applications.

20. The computer-accessible storage medium as recited in claim 16, wherein the program instructions are further computer-executable to implement:

receiving another request from the client application for access to the application server;

selecting a different one of the plurality of client-side ORBs on the client machine according to the load balancing scheme in response to the other request; and the client application accessing a different one of the plurality of application server instances using the different client-side ORB coupled to a server-side ORB of the different application server instance.

* * * * *